(12) United States Patent
Taguchi et al.

(10) Patent No.: US 11,391,015 B2
(45) Date of Patent: Jul. 19, 2022

(54) CONSTRUCTION MACHINE

(71) Applicant: KOBELCO CONSTRUCTION MACHINERY CO., LTD., Hiroshima (JP)

(72) Inventors: Tsukasa Taguchi, Hiroshima (JP); Masakazu Ozaki, Hiroshima (JP); Tsuguhito Fujita, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 496 days.

(21) Appl. No.: 16/273,445

(22) Filed: Feb. 12, 2019

(65) Prior Publication Data

US 2019/0301134 A1     Oct. 3, 2019

(30) Foreign Application Priority Data

Mar. 28, 2018 (JP) .............................. JP2018-061606

(51) Int. Cl.
*E02F 9/08* (2006.01)
*B01D 53/94* (2006.01)
(Continued)

(52) U.S. Cl.
CPC ............ *E02F 9/0883* (2013.01); *B01D 53/94* (2013.01); *E02F 9/0808* (2013.01);
(Continued)

(58) Field of Classification Search
CPC ............ B01D 2251/2067; B01D 53/94; E02F 9/0808; E02F 9/0833; E02F 9/0858;
(Continued)

(56) References Cited

U.S. PATENT DOCUMENTS 5,482,138 A * 1/1996 Mori .................... E02F 9/00
184/6
2010/0071998 A1 3/2010 Cerveny
(Continued)

FOREIGN PATENT DOCUMENTS

JP     2000-205491 A      7/2000
JP     2015-055054    *   3/2015
(Continued)

OTHER PUBLICATIONS

JP 2015-055054 (machine translation), Tanaka et al., Mar. 23, 2015.*

(Continued)

*Primary Examiner* — Phutthiwat Wongwian
*Assistant Examiner* — Diem T Tran
(74) *Attorney, Agent, or Firm* — Oblon, McClelland, Maier & Neustadt, L.L.P.

(57) ABSTRACT

Provided is a construction machine allowing a deck to be compact while facilitating water supply to a urea tank and access to a grease supply device. The construction machine includes a hose reel for grease supply disposed on a front-side portion of a deck of an upper slewing body, and a urea tank 30 disposed rearward of the hose reel on the deck and stores urea water for exhaust gas purification. The urea tank has a front surface provided with a water inlet for resupplying urea water. The hose reel is disposed deviated from the water inlet widthwise of the upper slewing body. The water inlet has a distal end located on the front side of a rear end of the hose reel.

6 Claims, 6 Drawing Sheets

(51) Int. Cl.
  *F01N 3/20* (2006.01)
  *F16N 7/36* (2006.01)
  *E02F 9/22* (2006.01)
  *F16N 7/38* (2006.01)

(52) U.S. Cl.
  CPC .......... *E02F 9/0833* (2013.01); *E02F 9/0858* (2013.01); *E02F 9/2275* (2013.01); *F01N 3/208* (2013.01); *F16N 7/36* (2013.01); *F16N 7/385* (2013.01); *B01D 2251/2067* (2013.01); *F01N 2610/02* (2013.01); *F16N 2210/04* (2013.01)

(58) Field of Classification Search
  CPC .. E02F 9/0883; E02F 9/2275; F01N 2610/02; F01N 3/208; F16N 11/08; F16N 2210/04; F16N 7/36; F16N 7/385
  See application file for complete search history.

(56) References Cited

U.S. PATENT DOCUMENTS

| | | |
|---|---|---|
| 2012/0067660 A1 | 3/2012 | Kashu et al. |
| 2014/0023473 A1* | 1/2014 | Kobayashi ............ E02F 9/0858 414/687 |

FOREIGN PATENT DOCUMENTS

| | | |
|---|---|---|
| JP | 2015-55054 A | 3/2015 |
| JP | 5965876 | 8/2016 |
| JP | 2016-223198 A | 12/2016 |

OTHER PUBLICATIONS

JP 2016-223198 (machine translation), Nakamura, Dec. 28, 2016.*
Extended European Search Report dated Sep. 4, 2019 in European Patent Application No. 19156354.3, 7 pages.

* cited by examiner

CONSTRUCTION MACHINE

TECHNICAL FIELD

The present invention relates to a construction machine equipped with a grease supply device for supplying grease to various parts of the machine and a urea tank for exhaust gas purification.

BACKGROUND ART

There have been conventionally known construction machines each equipped with an upper slewing body, a grease supply source unit that constitutes a grease supply device and has a pump unit and a grease can, and a hose reel, the grease supply source unit and the hose reel being arranged in a right-and-left direction on a deck that forms a front right portion of the upper slewing body (see FIG. 5 of Japanese Patent No. 5965876). Also known is a construction machine including a hose reel and a grease supply source unit arranged in a front-and-rear direction (see FIG. 3 in Japanese Patent No. 5965876).

However, installing a urea tank for exhaust gas purification in the front right portion (or a front left portion) of the upper slewing body in addition to the above-described grease supply device and the above-described hose reel requires expansion of the front right portion or the front left portion, which involves an increase in a scale of the entire upper slewing body. There exists, besides, a restriction for transportation, which requires the limitation of a deck width of the upper slewing body.

In addition to such a necessity to make layout of each of the elements compact, it is also necessary to take account of access to the grease supply device and the urea tank. More specifically, should be considered are water supply to the urea tank, visual check of winding of the hose reel, and access to a grease gun.

Such arrangement as described above of a grease supply source unit and a hose reel in the right and left direction makes it difficult to reduce a deck width. Furthermore, having a urea tank disposed frontward of the grease supply source unit and the hose reel makes it difficult to access the hose reel and visually check winding of the hose reel. On the contrary, having the urea tank disposed rearward of the hose reel and the grease supply source unit makes it difficult to access the urea tank and to supply water to the urea tank.

Besides, having the hose reel disposed on a rear side and having the grease supply source unit on a front side make it difficult to access to the hose reel and to visually check winding of the hose reel. Additionally, having the urea tank disposed between the hose reel and the grease supply source unit further deteriorates access to the hose reel and visual check of winding of the hose reel. Conversely, having the urea tank disposed rearward of the hose reel makes difficult it to access to the urea tank and to supply water to the urea tank.

SUMMARY OF INVENTION

An object of the present invention is to provide a construction machine including a urea tank and a grease supply device that are arranged on a deck, the construction machine allowing the deck to be compact while facilitating water supply to the urea tank and access to the grease supply device.

Provided is a construction machine including: a lower travelling body; an upper slewing body mounted on the lower travelling body so as to be slewable, the upper slewing body including a portion forming a deck, the portion being a front-left-side portion or a front-right-side portion; a flexible gun hose to which a grease gun for grease supply is connected; a hose reel disposed on a front side portion of the deck to wind the gun hose; and a urea tank that is disposed at a position rearward of the hose reel on the deck and stores urea water for exhaust gas purification. The urea tank has a tank front surface facing frontward of the upper slewing body, the tank front surface being provided with a water inlet for resupplying urea water to the urea tank through the water inlet. The hose reel is disposed at a position deviated from the water inlet widthwise of the upper slewing body, and the water inlet has a distal end that is located on a front side of a rear end of the hose reel.

DESCRIPTION OF EMBODIMENTS

Figure 1:
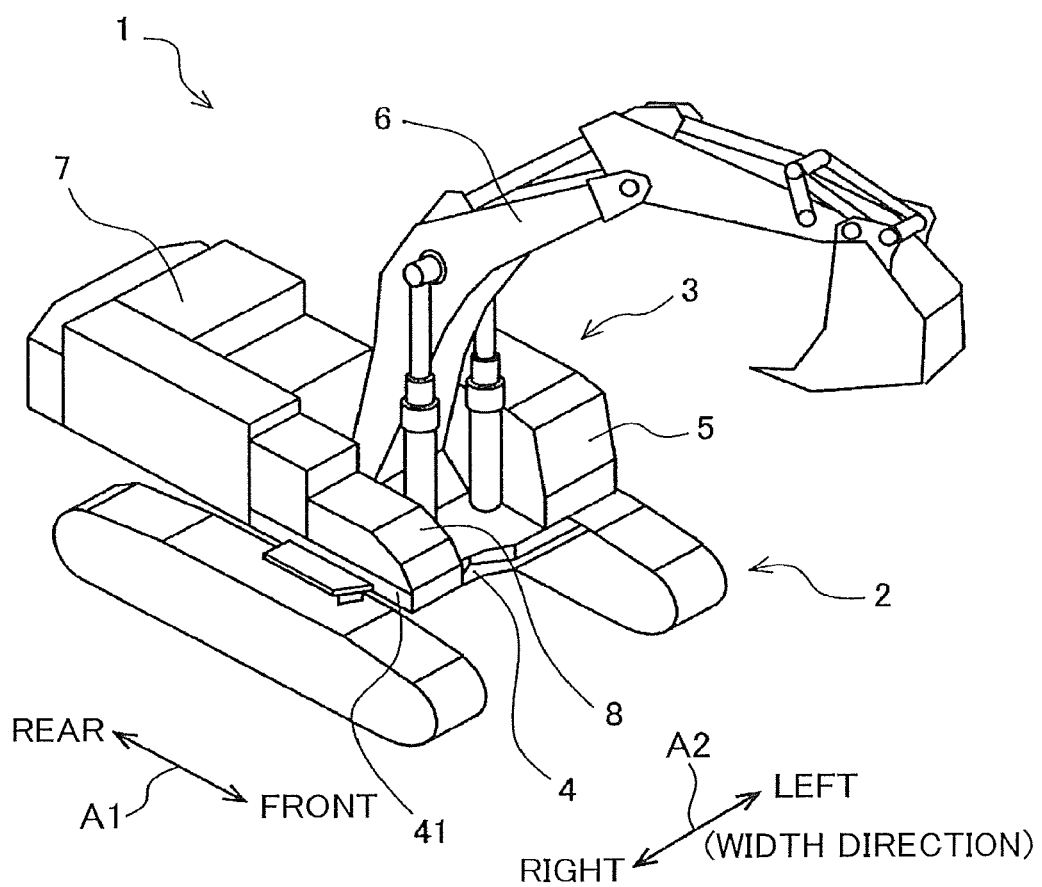
FIG. 1 is a perspective view showing an entire hydraulic excavator which is a construction machine according to an embodiment of the present invention.

Below will be described an embodiment of the present invention with reference to FIG. 1 to FIG. 8. FIG. 1 shows a hydraulic excavator 1 as an example of a construction machine according to the present invention.

The hydraulic excavator 1 includes a machine body which has a crawler-type lower travelling body 2 capable of travelling on the ground, and an upper slewing body 3. The upper slewing body 3 is mounted on the lower travelling body 2, being capable of slewing around a vertical axis relatively to the lower travelling body 2. The following description includes a front-rear direction and a right-left direction (a lateral direction or a width direction) of the upper slewing body 3, that correspond to respective directions indicated by arrows A1 and A2, in FIG. 1, in a state of slewing angle of 0°, the slewing angle being a relative angle of the upper slewing body 3 to the lower travelling body 2 as shown in FIG. 1, (that is, in a state of the normal position of the upper slewing body 3 relative to the lower travelling body 2).

The upper slewing body 3 has a main frame 4 referred to also as an upper frame, being supported by the upper slewing body 3 via a slewing bearing (not shown) so as to be slewable. On the main frame 4, mounted are a cab 5 as a driving room, a work attachment 6, a machine room 7, and the like. The cab 5 is disposed in a front left portion of the upper slewing body 3. The work attachment 6 is disposed in a central portion in the right-left direction of a front portion of the upper slewing body 3. The machine room 7 is disposed in a rear portion of the upper slewing body 3 to accomodate an engine and various pieces of equipment.

Figure 2:
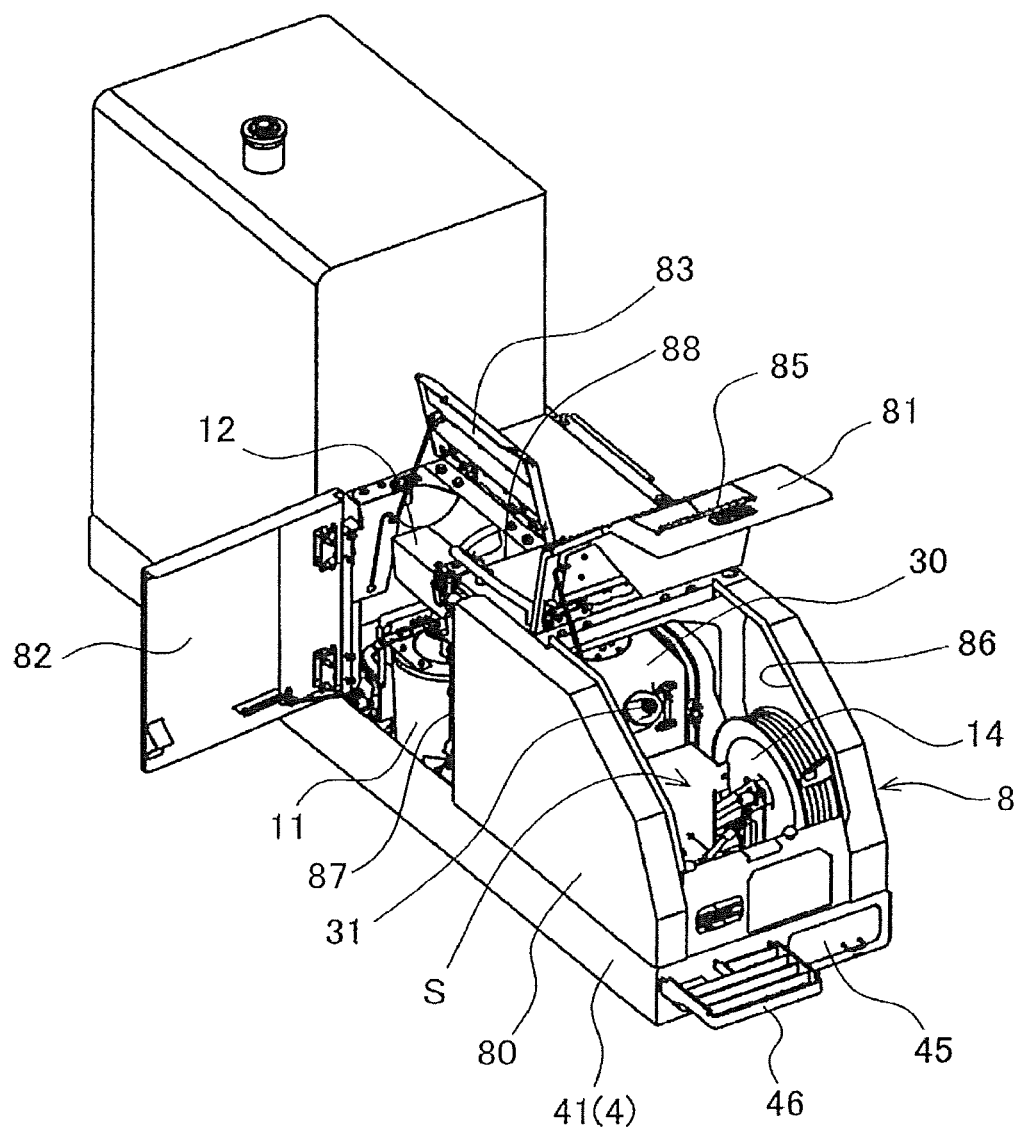
FIG. 2 is a perspective view showing a part near a deck of the hydraulic excavator.
Figure 3:
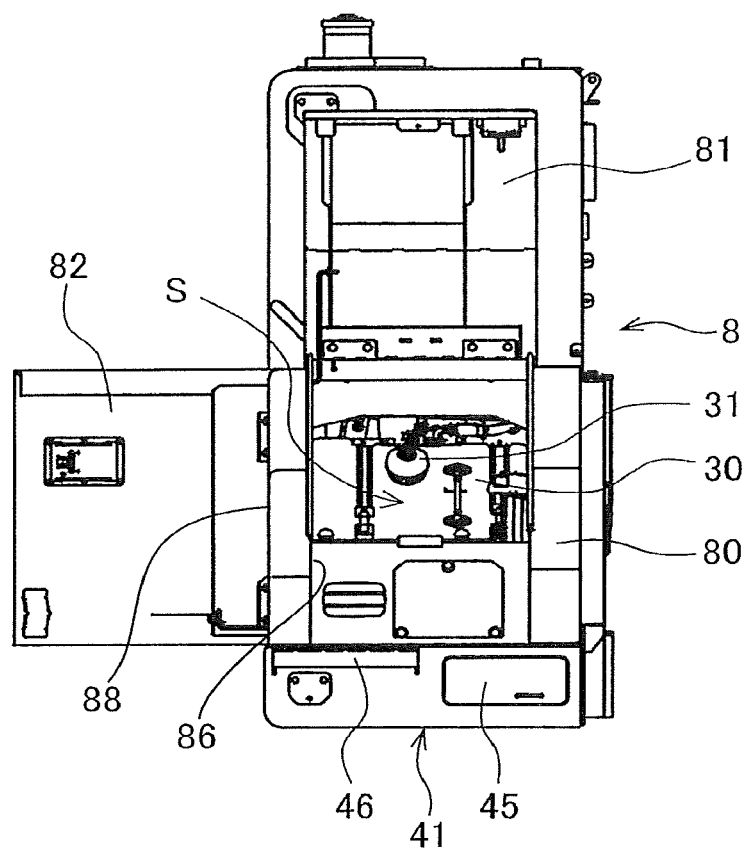
FIG. 3 is a front view showing the part shown in FIG. 2.

The main frame 4 has a front-right-side portion (alternately it may be a front-left-side portion according to the present invention) that forms a deck 41. The hydraulic excavator 1 further includes a grease supply device 10, a urea tank 30 shown in FIG. 2, and a housing box 8 which houses the grease supply device 10 and the urea tank 30, the housing box 8 being disposed on the deck 41. As shown in FIG. 2, the housing box 8 includes a box main body 80 and a plurality of covers for maintenance, which covers are attached to the box main body 80 so as to be capable of opening and closing. In an opening state, each of the covers enables the grease supply device 10 and the urea tank 30 to be accessed from the outside of the housing box 8. The plurality of covers include a front cover 81, a side cover 82, and an upper cover 83.

The box main body 80 has a front surface facing frontward of the upper slewing body 3, at least an upper portion of the front surface being inclined downward toward the front side as shown in FIG. 2. The front surface is formed with a front opening 86 opened frontward of the upper slewing body 3, the inside of the housing box 8 being opened frontward of the upper slewing body 3 through the front opening 86. The front cover 81 is attached to the box main body 80 so as to be capable of opening and closing the front opening 86, specifically, capable of vertically rotational movement The opening state of the front cover 81 allows visual check of a winding condition of a hose reel 14 and water supply to the urea tank 30 to be conducted through the front opening 86. The front cover 81 has a lower end portion formed with a step 85, which is a recessed portion allowing a worker to put his/her foot thereon to ascend to an upper portion of the upper slewing body 3.

Next will be described the grease supply device 10, which supplies lubrication grease to a plurality of rotationally movable parts and slidable parts included in the hydraulic excavator 1. The grease supply device 10 includes a grease can 11, a pump unit 12, a container hose 13A and a gun hose 13B shown in FIG. 5 and FIG. 7, each hose having flexibility, the hose reel 14, and a grease gun 15 shown in FIG. 5.

The grease can 11 is one mode of a grease storage container to store grease. The pump unit 12 is detachably attached to an upper portion of the grease can 11 and capable of sending out grease in the grease can 11 to a grease supply target.

Figure 4:
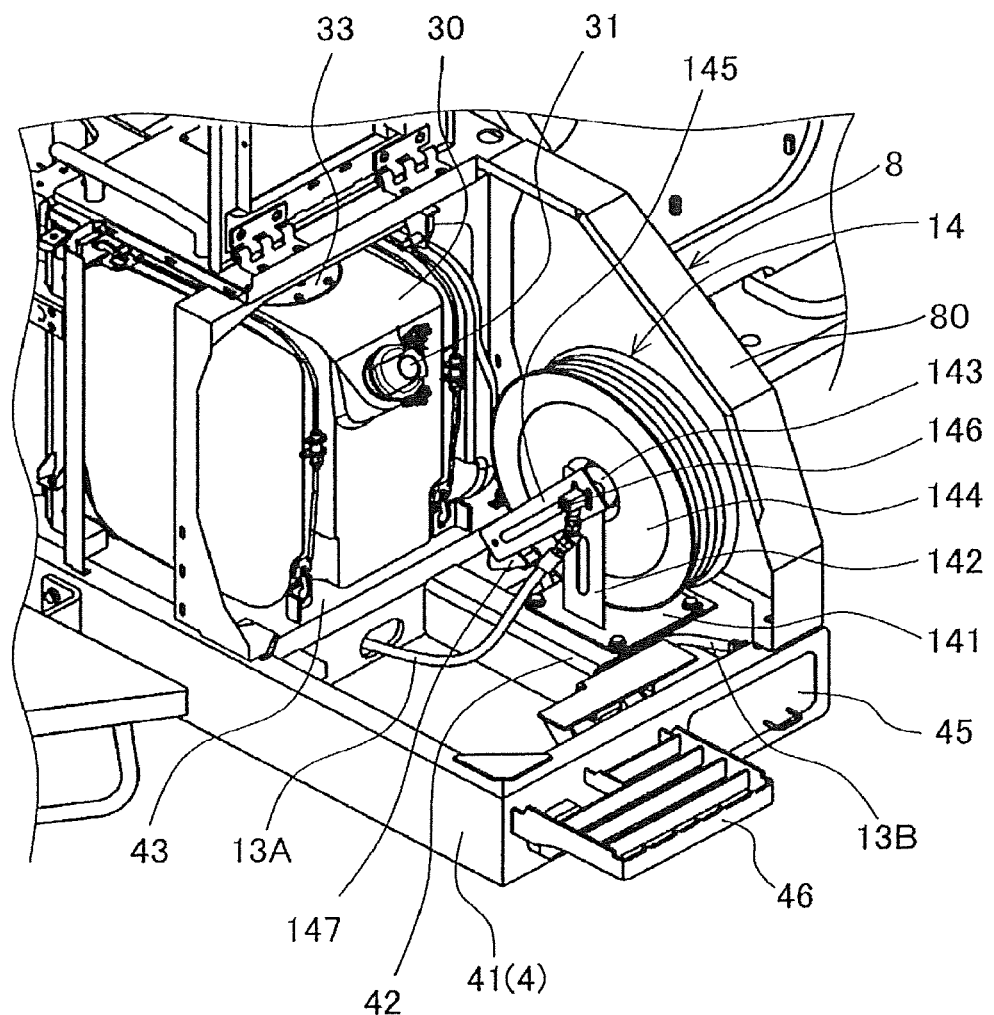
FIG. 4 is a perspective view showing an inside of a housing box shown in FIG. 2, the view showing a state without a cover at a side of the housing box.
Figure 7:
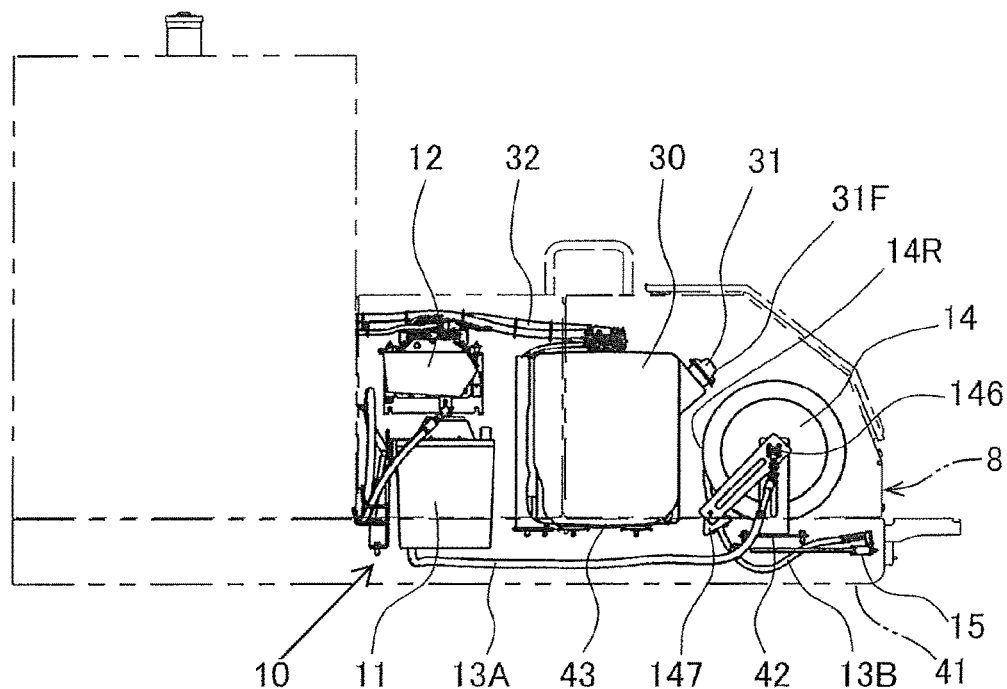
FIG. 7 is a side view showing the region of the housing box shown in FIG. 2 through the part indicated by chain double-dashed lines.
Figure 8:
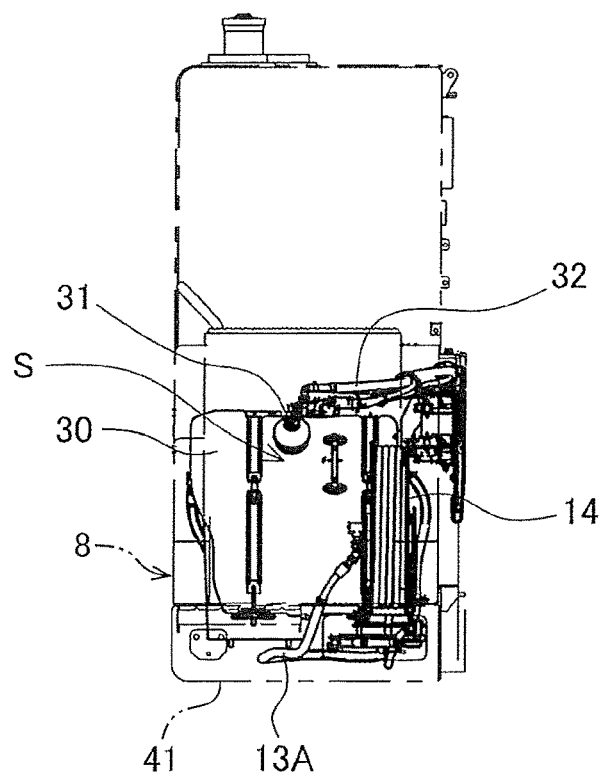
FIG. 8 is a front view showing the region of the housing box shown in FIG. 2 through the part indicated by chain double-dashed lines.

The container hose 13A has an inlet end and an outlet end opposite thereto, the inlet end being connected to the pump unit 12 and the outlet end being connected to an attachment part 146 for the hose reel 14 shown in FIG. 4. Thus, the inlet end of the container hose 13A connects the grease can 11 as a grease storage container and the hose reel 14 with each other via the pump unit 12. The container hose 13A is laid under the urea tank 30. In detail, the housing box 8 accommodates a urea tank installation stand 43 shown in FIG. 7 and FIG. 8, and the urea tank 30 is installed on the urea tank installation stand 43. The container hose 13A is laid so as to run under the urea tank installation stand 43. As shown in FIG. 8, the container hose 13A is laid within a width of the urea tank 30.

Also the gun hose 13B has an inlet end and an outlet end opposite thereto, the inlet end being connected to a not graphically shown attachment part of the hose reel 14 other than the attachment part 146, and the outlet end being connected to the grease gun 15 for grease injection. When the grease gun 15 is not used, the gun hose 13B is wound up around the hose reel 14 and housed in the housing box 8.

The deck 41 has a front end located under the front end of the housing box 8 and formed with a not-graphically-shown deck opening, and the front end is attached with a cover 45 for closing the deck opening. With removal of the cover 45, the deck opening is exposed to the outside to allow the grease gun 15 to be drawn to the outside of the deck 41 through the deck opening.

A foothold 46 for maintenance protrudes frontward from the front end of the deck 41. The foothold 46 is located adjacent to the cover 45 to allow a worker to put his/her foot on the foothold 46 and conduct water supply to the urea tank 30 and the like. In the front surface of the deck 41, the deck opening which allows the grease gun 15 to pass therethrough and the cover 45 which opens/closes the opening are provided on a widthwise inner side of the upper slewing body 3, that is, on a side closer to the hose reel 14, while the foothold 46 is provided on a widthwise outer side, that is, on a side closer to the urea tank 30.

In the front portion of the deck 41, the hose reel 14 is disposed on the widthwise inner side of the upper slowing body 3 (i.e. a side closer to the work attachment 6; right side in FIG. 2). On the deck 41, there is installed a reel attachment pedestal 42 shown in FIG. 4, having an upper surface as a reel attachment surface, and the hose reel 14 is attached on the reel attachment surface. The reel attachment pedestal 42 has a sectional shape opened inward in the right-left direction, defining a space inside the reel attachment pedestal, that is, in a portion under the reel attachment surface.

The hose reel 14 has a base plate 141, a pair of right and left supporting leg parts 142, a shaft 143, a drum 144, a pair of arm members 145, and a guide 147. The base plate 141 is attached on the reel attachment surface of the reel attachment pedestal 42 in a horizontal posture. The pair of supporting leg parts 142 stand upright on the base plate 141, and the shaft 143 has opposite end portions supported at respective upper ends of the pair of supporting leg parts 142 in such a posture that the shaft 143 extends in the right-left direction. The drum 144 is supported by the pair of supporting leg parts 142 so as to be rotatable around the shaft 143. The drum 144 has a cylindrical outer circumference surface coaxial with the shaft 143, and the gun hose 13B is wound around the outer circumference surface. The pair of arm members 145 extends outwardly from the supporting leg part 142 which is one of the pair of supporting leg parts 142 and located on the outer side. The guide 147 is supported by the pair of arm members 145 at respective front ends thereof, including a rotatable roller which guides the gun hose 13B to allow the gun hose 13B to be smooth drawn out from the drum 144.

Figure 5:
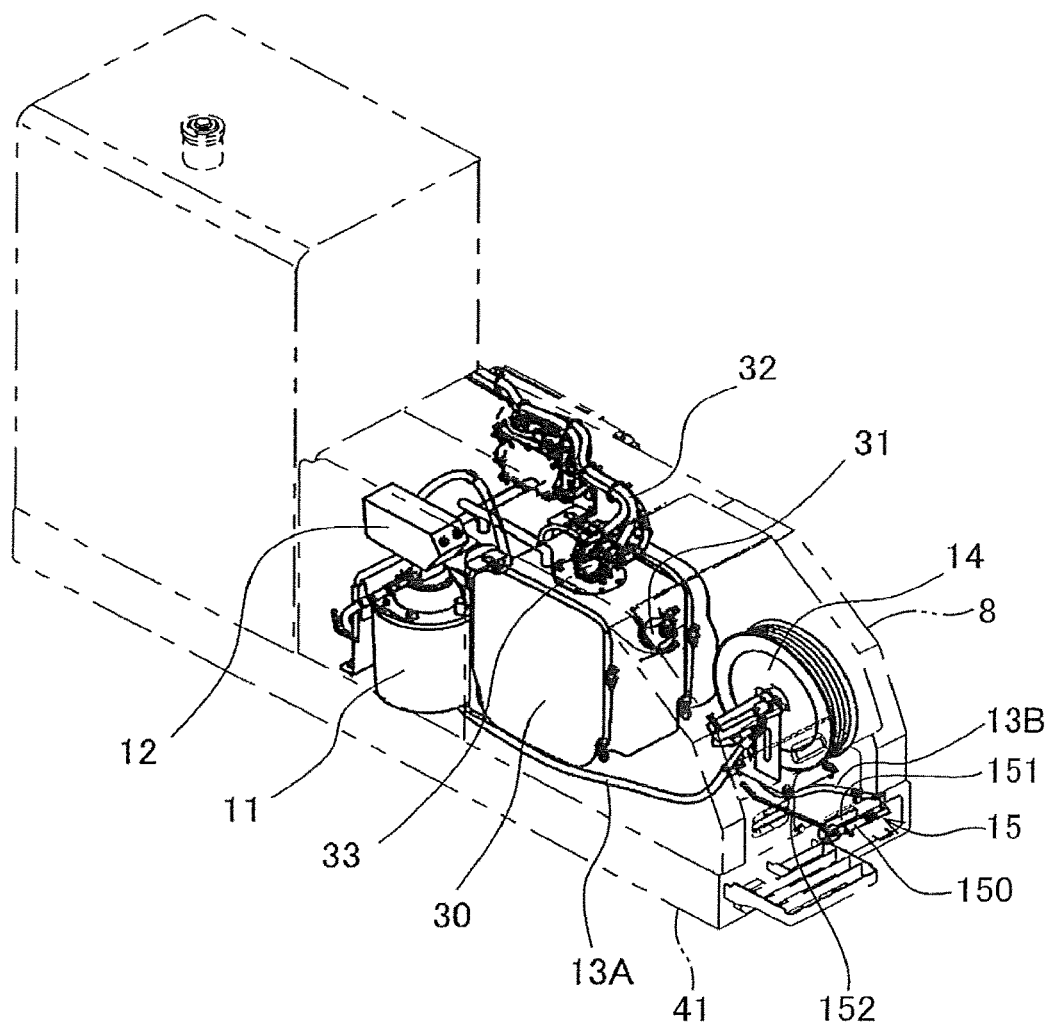
FIG. 5 is a perspective view showing the region of the housing box shown in FIG. 2 through the part indicated by chain double-dashed lines.
Figure 6:
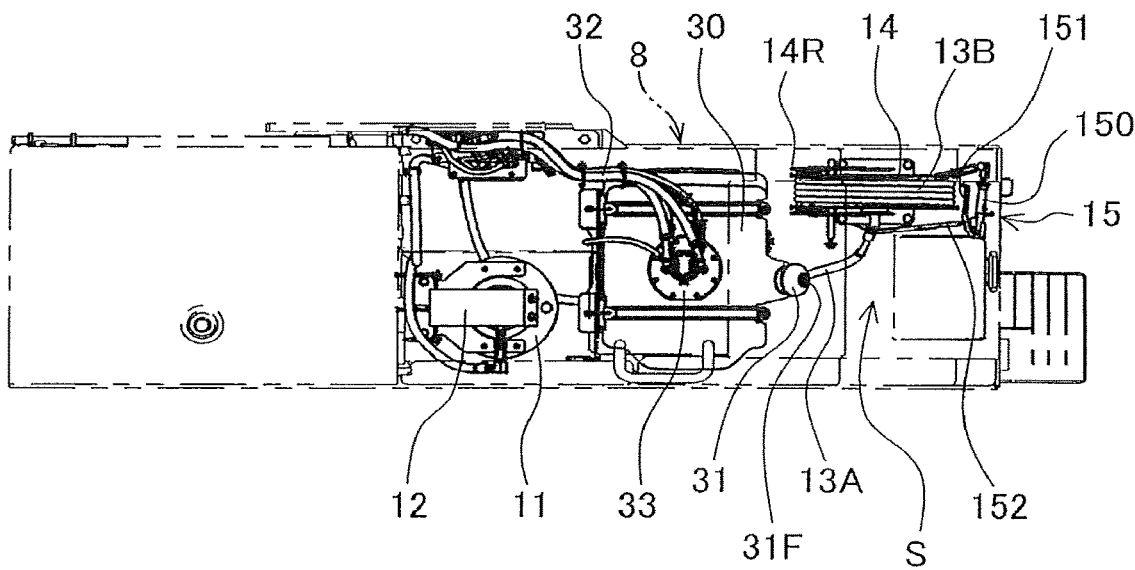
FIG. 6 is a plan view showing the region of the housing box shown in FIG. 2 through the part indicated by chain double-dashed lines.

As shown in FIG. 5 and FIG. 6, the grease gun 15 includes a main body portion 150, a lever 151, and a nozzle 152. The grease gun 15 can be housed under the hose reel 14. The main body portion 150 and the lever 151 of the thus housed grease gun 15 are located on the front side of the hose reel 14 and the nozzle 152 is located under the hose reel 14. As shown in FIG. 7, the gun hose 13B runs from a position rearward of the hose reel 14 and through a space under the guide 147 and the hose reel 14 to reach the front side, and the front-side end, i.e., the outlet end, is connected to the grease gun 15.

To conduct grease supply work by use of the grease supply device 10, the cover 45 provided on the front surface of the deck 41 is removed, and the grease gun 15 is taken out from the inside to the outside of the deck 41 through the deck opening that has been exposed by the above removal of the cover 45 and simultaneously the gun hose 13B connected to the grease gun 15 is drawn out. By applying a gripping operation to the lever 151 while directing the nozzle 152 of the grease gun 15 to a desired target to be supplied with grease, the pump unit 12 is operated to send grease in the grease can 11 to the grease gun 15, thereby having the grease discharged from the nozzle 152.

The urea tank 30 is a tank to store urea water for exhaust gas purification. The urea tank 30 has, for example, a substantially rectangular parallelepiped shape.

The urea tank 30 has a tank front surface facing frontward of the upper slewing body 3, the tank front surface provided with a water inlet 31. Through the water inlet 31, urea water is resupplied into the urea tank 30. The water inlet 31 is oriented frontward, in more detail, obliquely upward forward, that is, in a direction that is the same as both of the direction in which the grease gun 15 is drawn out and the direction in which the front opening 86 of the housing box 8 is opened.

The urea tank 30 has an upper surface allowing a lid part 33 to be attached to the upper surface. To the lid part 33 is attached a urea piping 32 for taking out urea water in the urea tank 30. The urea piping 32 runs generally in the front-rear direction toward a not-graphically-shown exhaust-gas purification device provided in the machine room 7 located rearward.

The urea tank 30 is disposed rearward of the hose reel 14. As shown in FIG. 8, at least a part of the hose reel 14 (half or more of the hose reel 14 in the present embodiment) overlaps the urea tank 30 with respect to the width direction of the upper slewing body 3. The hose reel 14 is disposed at a position slightly deviated from the water inlet 31 with respect to the width direction of the upper slewing body 3, thereby forming frontward of the water inlet 31 a water supply space S, which is a space for water supply work to the urea tank 30.

The water inlet 31 has a distal end 31F as shown in FIG. 6 and FIG. 7, the distal end 31F being located on the front side of the rear end 14R of the hose reel 14. Thus, the water inlet 31 that is a protrusion part of the urea tank 30 overlaps the hose reel 14 with respect to the front-rear direction. This allows the deck 41 to have a small size in the front-rear direction.

The grease can 11 and the pump unit 12 are installed at a position rearward of the urea tank 30, the position being closer to the outer side of the upper slewing body 3 in the width direction.

The box main body 80 has an outer side wall including a rear portion formed with a side opening 87 opened outward in the width direction of the upper slewing body 3 as shown in FIG. 2, and the side cover 82 is attached to the rear portion. The side cover 82 is attached to the outer wall so as to be capable of rotational movement, around a vertical axis, between an open position for opening the lateral opening 87 and a close position for closing the lateral opening 87. The side cover 82, when opening the lateral opening 87 at the open position, enables the grease can 11 and the pump unit 12 to be accessed from the outside of the housing box 8 through the lateral opening 87.

As shown in FIG. 2, the box main body 80 has an upper wall including a rear portion formed with an upper opening 88 opened upward and the upper cover 83 is attached to the rear portion. The upper cover 83 is attached to the rear portion of the upper wall so as to be capable of opening and closing the upper opening 88, specifically, so as to be capable of rotational movement around an axis in the front-rear direction. Locating at least one of the side cover 82 and the upper cover 83 at its opening position makes it possible to remove the pump unit 12 from the grease can 11 through at least one of the lateral opening 87 and the upper opening 88 and to replace the grease can 11 with a new one.

The hydraulic excavator 1 according to the above-described embodiment, in which the hose reel 14 is disposed on the front portion of the deck 41 and the urea tank 30 is disposed rearward of the hose reel 14, facilitates visual check of the hose reel 14. For example, tangling of the gun hose 13B or drop-off of the same from the hose reel 14 at the time of winding of the gun hose 13B can be easily checked.

The hose reel 14, disposed at a position deviated from the water inlet 31 of the urea tank 30 in the width direction of the upper slewing body 3, makes it possible to form the water supply space S for conducting resupply of urea water to the urea tank 30 at a position frontward of the urea tank 30. Specifically, the worker is allowed to conduct supply of water to the urea tank 30 with ease while standing on the foothold 46 protruding frontward from the front end of the deck 41 and temporarily placing a box including urea water in the water supply space S or other action. If the urea tank was installed in a front-most portion of the deck 41, the worker standing on the foothold 46 would be likely to lose balance because of the standing position that is too close to the urea tank 30. In contrast, the urea tank 30 according to the above-described embodiment, disposed away from the foothold 46 rearward across the water supply space S, allows water supply to the urea tank 30 to be conducted with ease.

The arrangement of the hose reel 14 and the urea tank 30 in the front-rear position enables the deck 41 to have a reduced width to improve transportation performance in comparison with, for example, an arrangement of the hose reel 14 and the urea tank 30 in the right and left direction. Furthermore, locating the distal end 31F of the water inlet 31 of the urea tank 30 on the front side of the rear end 14R of the hose reel 14 enables the deck 41 to have a reduced size in the front-rear direction.

The above-described embodiment, in which all of the hose reel 14, the urea tank 30, the grease can 11, and the pump unit 12 are arranged roughly within the width of the urea tank 30 as shown in FIG. 6, enables the deck 41 to have a further reduced width without hindering resupply of grease and urea water. Besides, laying the container hose 13A for grease supply in the front-rear direction, which is the same a the laying direction of the urea piping 32, allows the space for the laying to be reduced.

Disposing the hose reel 14 frontward of the urea tank 30 allows the dead space sideward of the hose reel 14 to be used as the water supply space S shown in FIG. 2 and FIG. 6. The space under the water supply space S can be used also as a housing space to house, for example, a fuel pump and a fuel drain cock. The under space does not hinder water supply. Thus, the space can be effectively used without hindering the water supply to the urea tank 30.

Since the water inlet 31 is oriented forward, that is, in the direction that is the same as the direction in which the grease gun 15 is drawn out from the deck 41 and the direction to which the front opening 86 is opened, it is possible to conduct all of operations including draw-out of the grease gun 15, visual check of a winding state of the hose reel 14, and water supply to the urea water tank 30 in the same direction. This enables the front cover 81 and the foothold 46 to be used in each of the above operations.

Installing the grease can 11 and the pump unit 12 rearward of the urea tank 30 prevents the grease can 11 and the pump unit 12 from hindering access to the water inlet of the urea tank 30. Besides, the lateral opening 87 formed in the housing box 8 and the side cover 82 which opens/closes the lateral opening 87 facilitate lateral access to the grease can 11 and the pump unit 12.

The container hose 13A laid so as to run under the urea tank 30 enables the deck 41 to have a further reduced width. Additionally, the container hose 13A, not running over the urea tank 30, allow the water supply space S around the water inlet 31 to be large. In other words, the container hose 13A does not hinder water supply.

The front cover 81 of the housing box 8 at the opening position allows the hose reel 14 to be accessed from the outside of the housing box 8, and the cover 45, when removed from the front surface of the deck 41, allows the grease gun 15 in the deck 41 to be taken out to the outside of the deck 41. These configurations facilitate grease supply by the grease supply device 10 to the work attachment 6, which is located in a front portion of the hydraulic excavator 1 and having high maintenance frequency. The configuration makes it possible to take out and house the gun hose 13B with visual check of the condition of winding of the gun hose 13B.

Running under the hose reel 14, the gun hose 13B allows the grease gun 15 to be installed on a bottom face of the deck 41 while ensuring routing of the gun hose 13B. This allows the grease gun 15 to be accessed from the ground.

Although housing the grease gun 15 in the deck 41 requires a fixed hose length from the hose reel 14 to the grease gun 15, the required hose length is allowed to be ensured under the hose reel 14, thus not hindering the deck 41 from having a reduced size in the front-rear direction. This enables the deck 41 to be disposed within the confines of the slewing radius of the cab 5, thereby facilitating grasping of a slewing range.

As shown in FIG. 7, the hose reel 14 is the lowest of an assembly including the pump unit 12 attached to the grease can 11, the urea tank 30, and the hose reel 14. Disposing the thus lowest hose reel 14 at the front-most side allows the space in the box main body 80 to be effectively utilized irrespective of the forward inclination of the upper portion of the front surface of the box main body 80 in the housing box 8 as described above.

The construction machine according to the present invention is not limited to the above-described embodiment but allowed to be variously modified and improved as long as recited in claims.

For example, while the water inlet 31 of the urea tank 30 in the above-described embodiment is oriented obliquely upward frontward, the orientation of the water inlet 31 is not limited thereto. The water inlet 31 may be oriented straightly frontward.

While the container hose 13A in the above-described embodiment runs under the urea tank 30 so as to be laid within the width of the urea tank 30, this is not always the case. The container hose 13A may be laid to run through a position other than the position under the urea tank 30, for example, over or sideward of the urea tank 30.

As described in the foregoing, a construction machine is provided including a urea tank and a grease supply device that are arranged on a deck, the construction machine allowing the deck to be compact while facilitating water supply to the urea tank and access to the grease supply device. The construction machine includes: a lower travelling body; an upper slowing body mounted on the lower travelling body so as to be slewable, the upper slewing body including a portion forming a deck, the portion being a front-left-side portion or a front-right-side portion; a flexible gun hose to which a grease gun for grease supply is connected; a hose reel disposed on a front side portion of the deck to wind the gun hose; and a urea tank that is disposed at a position rearward of the hose reel on the deck and stores urea water for exhaust gas purification. The urea tank has a tank front surface facing frontward of the upper slewing body, the tank front surface being provided with a water inlet for resupplying urea water to the urea tank through the water inlet. The hose reel is disposed at a position deviated from the water inlet widthwise of the upper slewing body, and the water inlet has a distal end that is located on a front side of a rear end of the hose reel.

The construction machine, in which the hose reel is disposed on the front-side-portion of the deck and the urea tank is disposed at a position rearward of the hose reel, enables visual check of the hose reel to be easily conducted. Additionally, disposed at a position deviated from the water inlet of the urea tank in the width direction of the upper slewing body, the hose reel enables a space to be secured sideward of the hose reel, the space being used to conduct supply of urea water into the urea tank. Besides, the arrangement of the hose reel and the urea tank in the front-rear direction on the upper slowing body allows the deck to have a reduced deck width to improve transportation performance thereof in comparison with, for example, an arrangement of the hose reel and the urea tank in the right-left direction of the upper slewing body. Furthermore, the distal end of the water inlet, located on the front side of the rear end of the hose reel, enables the deck to have a small size also in the front-rear direction of the upper slewing body.

Preferably, the construction machine further includes a housing box which is arranged on the deck and houses the hose reel and the urea tank, wherein the housing box has a box main body with a front opening opened frontward of the upper slewing body and has a front cover which opens/closes the front opening, and the water inlet is oriented in a direction that is the same as a direction in which the grease gun is drawn out and the same as a direction to which the front opening is opened. This enables all the works including draw-out of the grease gun, visual check of a winding state of the hose reel, and water supply to the urea water tank to be conducted in the same direction and enables the cover and the foothold for maintenance to be commonly used for each of the works.

Preferably, the construction machine further includes a grease storage container that is disposed rearward of the urea tank and stores grease and a pump unit attached to the grease storage container to send out grease stored in the grease storage container, wherein the box main body has a lateral opening which opens outward in the width direction of the upper slewing body to allow the grease storage container and the pump unit to be accessed through the lateral opening, and the housing box further has a side cover which opens/closes the lateral opening. The grease storage container and the pump unit, being disposed rearward of the urea tank, are prevented from hindering the water inlet of the urea tank to be accessed. The side cover, when opening the lateral opening, facilitates access to the grease storage container and the pump unit.

The construction machine preferably further includes a flexible container hose interconnecting the grease storage container and the hose reel, the container hose being laid so as to run under the urea tank. The container hose, laid so as to run under the urea tank, enables the deck width to be reduced. Besides, not running over the urea tank, the container hose enables a water supply space to be largely secured around the water inlet without hindering water supply.

This application is based on Japanese Patent application No. 2018-061606 filed in Japan Patent Office on Mar. 28, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:
a lower travelling body;
an upper slewing body mounted on the lower travelling body so as to be slewable, the upper slewing body including a portion forming a deck, the portion being a front-left-side portion or a front-right-side portion;
a flexible gun hose to which a grease gun for grease supply is connected;
a hose reel disposed on a front side portion of the deck to wind the gun hose;
a urea tank that is disposed at a position rearward of the hose reel on the deck and stores urea water for exhaust gas purification;
a grease storage container that is disposed rearward of the urea tank and stores grease; and
a housing box that is disposed on the deck and houses the hose reel, the urea tank, and the grease storage container, wherein
the urea tank has a tank front surface facing frontward of the upper slewing body, the tank front surface being provided with a water inlet for resupplying urea water to the urea tank through the water inlet,
the hose reel is disposed at a position deviated from the water inlet in a width direction of the upper slewing body,
the water inlet has a distal end that is located on a front side of a rear end of the hose reel,
the distal end of the water inlet is located closer to a front end of the deck than the rear end of the hose reel,
an upper end of the hose reel is disposed at a lower position than an upper end of the urea tank,
a part of the housing box that is disposed over the hose reel is inclined downward for approaching the front end of the deck, and
a step is formed on a front cover of the housing box.

2. The construction machine according to claim 1, wherein the housing box has a box main body with a front opening which is opened frontward of the upper slewing body and has a front cover which opens/closes the front opening, and the water inlet is oriented in a direction that is same as a direction in which the grease gun is drawn out and same as a direction to which the front opening is opened.

3. The construction machine according to claim 2, further comprising:
a pump unit attached to the grease storage container to send out grease stored in the grease storage container, wherein the box main body has a lateral opening which opens outward in the width direction of the upper slewing body to allow the grease storage container and the pump unit to be accessed through the lateral opening, and the housing box further has a side cover attached to the box main body so as to open/close the lateral opening.

4. The construction machine according to claim 3, further comprising a flexible container hose interconnecting the grease storage container and the hose reel, the container hose being laid so as to run under the urea tank.

5. The construction machine according to claim 1, wherein the upper end of the hose reel is disposed at a lower position than the distal end of the water inlet of the urea tank.

6. The construction machine according to claim 1, wherein the hose reel, the urea tank, and the grease storage container are arranged within a width of the urea tank.

* * * * *